US011629697B2

(12) United States Patent
Busker

(10) Patent No.: US 11,629,697 B2
(45) Date of Patent: Apr. 18, 2023

(54) CONTROLLING A WIND FARM

(71) Applicant: Wobben Properties GmbH, Aurich (DE)

(72) Inventor: Kai Busker, Großefehn (DE)

(73) Assignee: Wobben Properties GmbH, Aurich (DE)

(*) Notice: Subject to any disclaimer, the term of this patent is extended or adjusted under 35 U.S.C. 154(b) by 406 days.

(21) Appl. No.: 16/984,734

(22) Filed: Aug. 4, 2020

(65) Prior Publication Data
US 2021/0040936 A1  Feb. 11, 2021

(30) Foreign Application Priority Data

Aug. 8, 2019 (DE) .......................... 102019121413.0

(51) Int. Cl.
| | |
|---|---|
| *F03D 7/04* | (2006.01) |
| *F03D 9/25* | (2016.01) |
| *F03D 7/02* | (2006.01) |
| *H02J 3/06* | (2006.01) |
| *H02J 3/14* | (2006.01) |

(52) U.S. Cl.
CPC .......... *F03D 7/048* (2013.01); *F03D 7/0284* (2013.01); *F03D 9/257* (2017.02); *H02J 3/06* (2013.01); *H02J 3/14* (2013.01)

(58) Field of Classification Search
CPC ........ F03D 7/048; F03D 7/0284; F03D 9/257; H02J 3/06; H02J 3/14; F05B 2270/1033; F05B 2270/337; Y02E 10/72
See application file for complete search history.

(56) References Cited

U.S. PATENT DOCUMENTS

| | | | | |
|---|---|---|---|---|
| 9,541,062 | B2 * | 1/2017 | Yin ........................... | H02J 3/46 |
| 2011/0241356 | A1 * | 10/2011 | Khoshnevis .............. | H02P 9/04 |
| | | | | 290/1 R |
| 2011/0301769 | A1 | 12/2011 | Lovmand et al. | |
| 2013/0104236 | A1 * | 4/2013 | Ray ..................... | H04L 63/1408 |
| | | | | 726/25 |
| 2013/0320938 | A1 * | 12/2013 | Deng ....................... | H02K 7/09 |
| | | | | 322/90 |

(Continued)

FOREIGN PATENT DOCUMENTS

| | | |
|---|---|---|
| EP | 2876768 A1 | 5/2015 |
| WO | 2014/012789 A1 | 1/2014 |

*Primary Examiner* — Ziaul Karim
(74) *Attorney, Agent, or Firm* — Seed IP Law Group LLP

(57) ABSTRACT

Provided is a method of controlling a wind turbine group having a plurality of wind turbines. Each wind turbine generates electrical power as wind turbine output power for feeding into an electrical supply network. The group feeds a group power output into the network at a grid connection point, and the group power output is substantially formed as the sum of all the turbine power outputs of the group. A maximum group power output is specified for limiting the group power output, a control value for compliance with the maximum group power output is transferred to each wind turbine in the group in order to limit the output power of the respective wind turbine to a maximum value defined by the control value, and a control relationship is determined between potential control values and potential group power outputs using the control relationships and depending on the maximum group power output.

23 Claims, 5 Drawing Sheets

(56) References Cited

U.S. PATENT DOCUMENTS

| | | | |
|---|---|---|---|
| 2015/0137518 A1* | 5/2015 | Yin | F03D 7/048 |
| | | | 290/44 |
| 2015/0148974 A1 | 5/2015 | Diedrichs | |
| 2016/0248255 A1* | 8/2016 | Rive | G06Q 50/06 |
| 2017/0335824 A1* | 11/2017 | Gupta | H02J 3/0012 |
| 2018/0294650 A1* | 10/2018 | Shukla | H02K 7/183 |

* cited by examiner

CONTROLLING A WIND FARM

BACKGROUND

Technical Field

The present invention relates to a method of controlling a wind turbine group having a plurality of wind turbines. Such a wind turbine group can be a wind farm, but a wind farm can also comprise a plurality of wind turbine groups. The present invention also relates to a wind turbine group having a plurality of wind turbines, and the present invention relates to a wind farm.

Description of the Related Art

Wind turbines are known from the prior art. They generate electrical power from the wind and feed that power into an electrical supply network, namely at a grid connection point. The proportion of electrical power that is fed into an electrical supply network by wind turbines is increasing strongly in the world, and in some countries in particular, so electrical power from wind turbines is considered as an option also when contemplating grid support for the electrical supply network.

Ideally, a wind farm feeds so much electrical power into the electrical supply network as is possible given the prevailing wind, the capacity of the wind farm and its wind turbines, and the capacity of the grid connection point. One option for supporting the electrical supply network in this regard is that an operator of the electrical supply network, or some other body, can temporarily demand a reduction in power at the grid connection point.

Such a power reduction can be transmitted as an absolute power value to the wind farm, such that the wind farm must limit its fed-in power to that absolute power value. This absolute power value can be divided among the individual wind turbines for implementation purposes. For example, if there are ten wind turbines in the wind farm, the specified absolute power value can be divided in such a way that each wind turbine in the wind farm is limited to one tenth of this absolute power value.

However, if, for example, one of the ten wind turbines in the wind farm mentioned by way of example is not in operation, for example because it is in a maintenance mode, it will not be able to feed in any power at all. If the other nine wind turbines were nevertheless to feed in only one tenth of the limited power output value, the wind farm would feed in too little power in total.

Similar problems could also arise if the wind farm is designed as a mixed farm in which different wind turbines are operated, in particular wind turbines of different sizes. In this case, a small wind turbine could be given as its limit a power value that it does not even reach. In that case also, the undesired effect is that the wind farm feeds in too little power.

One way of taking different sizes of wind turbines into account may be that each of the wind turbines is given only a percentage value that relates to the rated output of each wind turbine, for example. However, this could not remedy the problem of the farm feeding the wrong amount of power if one wind turbine is not in operation at all.

One possible solution would be to compare the actual power fed in at the grid connection point with the specified power value that indicates the limit. If a difference arises, the limit values transmitted to the individual wind turbines can be increased accordingly until the difference between the power fed in at the grid connection point and the power specified as a limit has reached zero. This can be achieved using an integral controller, for example.

This in fact would result in an integral controller which also has the known disadvantages, therefore, namely that a system capable of oscillations may ensue. If a suitably large integration time constant, i.e., a small gain factor is chosen, stable control may be achievable, but relatively slow control would be expected.

It is also problematic, in particular, or at least unfavorable, that whenever the limit value is divided broadly and evenly among all the wind turbines, be it as a percentage value or as an absolute value, such an externally specified limitation of power to a particular value will, in principle, produce the same individual targets for the wind turbines every time, regardless of whether the wind turbines are generating a lot of power or only a little at that moment. Every wind turbine must then adjust its operating point to the new setpoint, and only then is it possible to check whether this also in fact results in the desired power limitation at the grid connection point. Only then can a difference be determined which in turn can then be corrected. What can regularly happen then is that each wind turbine must firstly change its operating point significantly, in order to then change it significantly again after the control system is activated.

BRIEF SUMMARY

A specified power limitation at a grid connection point of a wind farm, or at least of a group of wind turbines, is distributed as efficiently as possible among the individual wind turbines in the wind farm or among the wind turbine group.

A method is provided. The method thus relates to controlling a wind turbine group having a plurality of wind turbines. Such a wind turbine group can also be a wind farm. It is also conceivable, however, that a wind farm comprises a plurality of wind turbine groups.

In any case, each of the wind turbines in the wind turbine group generates electrical power as wind turbine output power for feeding into an electrical supply network. Wind turbine output power thus refers to the power output that each wind turbine generates, which can differ, of course, from one wind turbine to the next.

The wind turbine group feeds a group power output into the electrical supply network at the grid connection point. The group power output is substantially formed as the sum of all the turbine power outputs of the wind turbine group. However, the group power output does not have to be exactly equal to the sum of all the wind turbine power outputs, as it is also conceivable that farm losses have to be deducted. Such farm losses can be caused, for example, by transmission lines within the wind farm, via which the wind turbine output power is transmitted from the respective wind turbine to the grid connection point. The farm losses can also be negative, in principle.

A maximum group power output is specified in order to limit the group power output. If the wind turbine group is a wind farm, the group power output can equal the power fed in at the grid connection point, and the maximum group power output then equals the maximum power that may be fed at that moment into the electrical supply network at the grid connection point. Such a maximum infeed power for the grid connection point can be specified by a grid operator, in particular. However, it can also be specified by another control unit in the electrical supply network, to give another example.

If the wind turbine group is not the same as a wind farm, but a wind farm has a plurality of wind turbine groups, the maximum group power can be part of a maximum power to be fed in at the grid connection point, i.e., a maximum farm power. One option, for example, is that the grid operator already mentioned above as an example specifies a maximum power to be fed in at the grid connection point, and that power is distributed equally among a plurality of wind turbine groups within the wind farm. This maximum power at the grid connection point can be distributed among three wind turbine groups each allocated one third, for example, if the wind farm only has these three wind turbine groups and they each have approximately the same output.

The maximum group power is specified for one wind turbine group in any case, however. In order to comply with the maximum group power output, a control value is transferred to each wind turbine in the wind turbine group in order to limit the output power of the respective wind turbine to a maximum value defined by said control value. The respective maximum value for each wind turbine is thus defined by the control value. It is particularly preferred in this regard that the control value be specified as a percentage value which can define the maximum value in relation to the nominal power of the respective wind turbine.

The control value is a single value that is the same for every wind turbine. If the control value is a percentage value in relation to the nominal power of the respective wind turbine, a different absolute power value can therefore be assigned to that control value in wind turbines having different nominal power ratings.

In order to determine the control value, it is proposed that a control relationship is determined as a relationship between potential control values and potential group power outputs. A relationship is thus established which determines correspondingly different or possibly even equal potential group power outputs for different potential control values. For that purpose, a table may be provided, for example, which has different control values in one column and assigned group power outputs in another column. These control values and group power outputs defining the control relationship can be referred to as potential control values and potential group power outputs, respectively, in order to emphasize that they are available for selection but not yet selected. Aside from that emphasis, the prefix "potential" is dispensable, so there is no difference between control values and group power outputs, on the one hand, and potential control values and potential group power outputs, on the other hand.

It is further proposed that the control value is determined using the control relationship and as a function of the specified maximum group power output. In the simplest case, this can mean that, based on the specified maximum group power output, a potential group power output of the same magnitude, i.e., with the same value, is sought in the control relationship, for example in the aforementioned table, and that the assigned potential control value is used in that regard as the control value.

For example, if the control relationship is reproduced in a table, a potential group power output of 4 megawatt (MW) could be entered in the table for a potential control value of 40%, a potential group power output of 5 MW could be entered for a potential control value of 50%, and a potential group power output of 5.5 MW could be entered in the table for a potential control value of 60%. This is only meant as a simplified and illustrative example that of course is nothing more than one detail of a control relationship.

If a maximum group power output of 5 MW is now specified for this example, a potential control value of 50% is found for a potential group power output of 5 MW. In that case, 50% is then used as the control value. To comply with the maximum group power output, this control value of 50% is then transferred to each wind turbine in the wind turbine group. In response, each wind turbine will then provide exactly 50% or a maximum 50% of its respective nominal power.

Further details are described below. To start with, however, the advantage that is already obtained at this point is that a control value could be directly assigned to the specified maximum group power output, which in the simplified example is 5 MW. This control value could be transmitted to the wind turbines and they could immediately adjust their power output on that basis. This can obviate the need for a protracted control procedure in which the values for the wind turbines, i.e., the power outputs to be set for the individual wind turbines, first have to be introduced in such a way that the group power output at the grid connection point adjusts itself to the value of the specified maximum group power output.

It is self-evident that the control relationship is selected accordingly so that the control values also in fact belong to the respective group power outputs which are then set when such a control value is implemented in the manner described.

According to one embodiment, it is proposed that the control relationship is stored as a table of value tuples, and each value tuple contains a potential control value and a potential group power output. The control relationship can thus be stored as a series of value tuples in a table. In the simplest case, each value tuple contains only one potential control value and one potential group power output, so each value tuple forms a pair of values in that respect. A control value can thus be found in a simple manner by looking up in the table the pair of values or the value tuple for which the potential group power output is equal or closest to the specified maximum group power output. The control value can then be simply read off the table.

However, it is also conceivable that further elements are included, such as a serial number. In this case, inclusion of the serial number as a further value would mean that three values are included, so there would then be a value tuple.

One option is that the control relationship additionally includes a threshold control value. Such a threshold control value is representative of the smallest control value at which the assigned group power output has reached its current maximum value. The threshold control value may preferably be composed of the value of the smallest control value plus a reserve value.

The control value is provided to control each individual wind turbine so as to obtain a maximum value, namely the maximum group power output at the grid connection point. In that respect, the control value will also and essentially perform the function of an upper limit. The maximum power that can be generated is also limited by the wind speed, thus resulting, particularly at wind speeds below the nominal wind speed, in potential control values with potential group power outputs where, due to the lower wind speed, the potential group power output can no longer be increased even when there is a higher potential control value. This means it is no longer possible to increase the group power output by increasing the control value. To that end, it is proposed that the first or smallest control value, for which the potential group power output is currently at the power limit which can at all be generated, due to the prevailing wind, is additionally marked and/or stored as a threshold control value.

If, depending on a specified maximum group power output, and on the basis of a potential group power output, an assigned potential control value is found in the table, it can then be checked whether the latter exceeds the threshold control value. If that is the case, the threshold control value can be used as the current control value, because with the larger potential control value that has been found, it is not possible in that case for more power to be generated due to the prevailing wind speed.

The threshold control value can preferably be equal to the smallest control value at which the group power output does not increase any further, plus a reserve value. If, for example, a control value is used in the form of a percentage value that in principle can range from 0 to 100%, the reserve value can be 5% or in the region of 5%, for example in a range between 2 and 10%. Fluctuations in the prevailing wind can be taken into account by means of this reserve value. This prevents the wind turbine output power being limited unnecessarily as a result of using the threshold control value, due to the wind speed increasing slightly since the threshold control value was calculated or, for example, because other inaccuracies might cause an undesired limitation.

The threshold control value is preferably stored together with the control relationship, which is stored as a table of value tuples, in other words it is stored additionally. However, it is also conceivable, in principle, that the threshold control value is included additionally in the control relationship, without the control relationship being realized in the form of a table. The control relationship could also be taken into account, for example, using a functional relationship between the control value and the group power output. Nonlinear relationships between potential control values and potential group power outputs could be taken into account, for example, by piecewise composite functions.

The control value is preferably specified as a relative value, in particular as a percentage value, especially in relation to a nominal power. The control value can thus be taken from the control relationship, for example from the aforementioned table, and gives a percentage value in relation to a nominal power. The percentage value thus calculated can thus be transmitted directly to the individual wind turbines in the wind turbine group, where it is then interpreted as a percentage value in relation to the respective nominal power of each individual wind turbine.

According to one embodiment, it is proposed that, in order to produce the control relationship, a potential group power output is calculated for each potential control value successively for a plurality of potential control values from a predefinable first potential control value to a predefinable last potential control value. In particular, the potential control values can be counted in 1% steps from 1% to 100%, with a potential group power output being calculated for each potential control value, i.e., for each percentage value in the example. The result can be entered, for example, in an appropriate table with respective value pairs or value tuples. The control values can also be processed in a different order.

The potential group power output for the respective potential control value is calculated as the sum of the power outputs that can theoretically be generated by each of the wind turbines in the wind turbine group. The power that can theoretically be generated by the wind turbine is calculated depending on a nominally limited power rating and depending on an available power.

The nominally limited power is calculated using the nominal power of the wind turbine and the potential control value. More particularly, the nominally limited power is calculated as the product of the nominal power of the respective wind turbine and the potential control value, if the control value is expressed as a percentage value.

The available power denotes an electrical power output that can currently be generated by the wind turbine. If the wind turbine has not been subjected to limitation, the available power is substantially equal to the power that is actually being generated at that moment. The power actually being generated can also be used then, accordingly, as the available power for this calculation of the power that can theoretically be generated.

However, if the wind turbine's output is limited, for example because it must be operated at a lower speed and/or with less power output due to a noise protection regulation, then the available power output is the power output that the wind turbine would be able to generate if it did not have to comply with that limitation. For that purpose, the wind turbine can measure the wind speed, for example, and the available power can be calculated as a function thereof.

The power that can theoretically be generated is then calculated using the nominally limited power and the available power, and this is done in such a way, in particular, that the smaller of the two power outputs is used. The power output that can theoretically be generated is thus the smaller of the nominally limited power output and the available power output.

The power that can theoretically be generated can be calculated in this manner for each wind turbine in the wind turbine group, and the result is added together to form the potential group power output for the respective potential control value.

The potential group power output is determined in the same manner for many other control values. In particular, this can be done for every control value in the range from 1% to 100%, preferably in 1% increments. The result obtained is the control relationship, and in that respect the result can be a table which is filled accordingly.

The control relationship is preferably updated within predefinable time intervals, in particular within chosen time intervals of less than one minute. The control relationship is thus updated once a minute or more frequently.

This is based, in particular, on the idea that the wind speed can fluctuate and hence that the control relationship can also vary. The control relationship can be produced within a few seconds, so it is possible that an up-to-date current control relationship is always available, namely one that matches the prevailing wind.

To comply with the maximum group power output, a control value is thus determined which depends on a control relationship as described in the foregoing. For the prevailing wind speed at that moment, this control relationship, and thus the control value calculated on that basis, forms a fixed value. The adjustment of the wind turbines on the basis of that control value can also be regarded, therefore, as a form of control in which there is no feedback and where a fixed control value is used instead.

The updating of the control relationship is preferably continued even when the wind turbine group limits its group power output to a specified maximum group power output. In this case also, the available power is preferably calculated as the power that the respective wind turbine would be able to generate if this limitation on the maximum group power output did not apply.

The control relationship is regularly updated in this case also, therefore, so new control values can also be produced then, which are then applied accordingly as well, i.e., they can be transmitted to the wind turbines.

According to one embodiment, it is proposed that a reference relationship be determined. Such a reference relationship can also be produced as, or referred to as a second table that allows faster assignment of the maximum group power output to a potential group power output of the control relationship, particularly when the control relationship is stored as a table.

A relationship between potential group power outputs and potential control values is thus determined as the reference relationship on the basis of the control relationship, in order to obtain a control value from a specified maximum group power output by means of the reference relationship. In particular, the relationship is determined only for some of the potential control values, by using only every n-th potential control value from the potential control values of the control relationship, where n is an integer from 2 to 100. In this way, it is possible in a first assignment step to find a quick first relationship between a specified group power output and a potential control value assigned in a first approximation. In a second assignment step, it is then possible to determine and use a more precisely assigned potential control value based on the potential control value assigned in the first approximation and on the control relationship.

For example, the control relationship can take control values ranging from 1% to 100%, in 1% increments. To obtain the reference relationship from this control relationship, every tenth value of the control relationship, for example, can be incorporated in the reference relationship, for example 10%, 20%, 30%, etc., and including the potential group power output that is assigned. The reference relationship can also contain a table, therefore, but one which contains only ten entries, in the example above.

In order to now find a control value, depending on a specified maximum group power output, it is possible on the basis of a maximum group power output, for example, to select an assigned potential group power output in the reference relationship, which comes closest to the value of the specified maximum group power output. Given a specified maximum group power output of 10 MW, for example, a potential group power output value of 8 MW, to which a potential control value of 40% could be assigned, could be found in the reference relationship. This pair of values, having a control value of 40% with an assigned potential group power output of 8 MW, then has a counterpart as well in the control relationship. This value of 40% at 8 MW can thus be found directly and quickly in the control relationship. This value of 8 MW for the potential group power output is already very close to the specified maximum group power output of 10 MW.

Based on that, a refined search can now be conducted in the control relationship by looking for higher values than the potential group power output of 8 MW, until the control value of 10 MW is found as the potential group power output in the control relationship. A control value of 45% could be assigned to the latter, and that control value was thus found quickly. An initial fast, but imprecise search was thus conducted using the reference relationship. Proceeding from there, a more refined search was then conducted in the control relationship.

In the second assignment step, i.e., the more refined assignment in the control relationship, an interpolation is preferably carried out between two potential control values of the control relationship. In the example above, this could mean that the control relationship, too, does not have exactly the value of 10 MW at all as the value of the potential group power output, but only a value of 9.8 MW, for example, and 10.2 MW as the next value. If a control value of 44% or 45%, respectively, is assigned to these values in the example, it is possible to find a value of 44.5% by interpolation, for example by linear interpolation.

According to one embodiment, it is proposed that the control relationship is determined in a central group computer for the whole wind turbine group, that the group computer receives the required values, including operating values, on a regular basis from the wind turbines in the wind turbine group, that the group computer determines the control value and transfers it to all the wind turbines in the wind turbine group. If the wind turbine group forms a wind farm or part of a wind farm, the central group computer can be designed as part of a central wind farm control system. In order to determine the control relationship, information is required about every single wind turbine and its operation, and this information can also be compiled in the group computer.

Depending on the type of control relationship to be produced, the nominal power rating, status and the prevailing wind in its area, or values derived therefrom, are required from each wind turbine. The status of the wind turbine includes, in particular, whether it is available at all or, for example, is temporarily unavailable due to maintenance work. Instead of or in addition to information about the wind speed, the wind turbine itself can determine its available power output and transmit it to the group computer. The available power can be determined directly from the measured wind, for example. However, it is preferably determined from operating values and the status of the wind turbine. In particular, the available power can be determined from a current speed of the wind turbine and its currently generated power output, and from a position or the angle of its rotor blades. This can be done at the wind turbine, such that the wind turbine then transmits its available power to the central group computer, or the aforementioned values required for the calculation are transmitted from the wind turbine to the central group computer so that the central group computer can calculate the available power itself.

It is also proposed that the wind turbine transmits its currently generated power output to the central group computer whatever the case. The currently generated power can be understood as an operating value, just like the current speed and/or a current blade angle.

The nominal power of the respective wind turbine is also required to determine a nominally limited power output. The nominal power of each wind turbine can be stored in the central group computer. However, it is preferable if the nominal power of each individual wind turbine can also be transmitted to the central group computer. This can prevent the respective nominal power being stored incorrectly in the central group computer.

The control value is preferably composed of a fixed control term and a variable control term, wherein the fixed control term is determined using the control relationship and as a function of the specified maximum group power output, and the variable control term is determined as a function of a setpoint/actual value comparison between the specified maximum group power output and the group power output fed to the grid at the grid connection point. The fixed control term is thus determined in the manner described above, using the control relationship. The fixed control term can also be understood, therefore, as the term that is used as control or to control, namely without control feedback.

The variable control term, on the other hand, depends on a comparison of setpoint and actual values and can also be understood, therefore, as a control term.

It is particularly proposed in this regard that the variable control term be limited to a maximum of one tenth of a maximum value of the control value. If a percentage value is specified as the control value and therefore ranges from 0% to 100%, then the variable control term is limited in absolute terms to a maximum of 10%, preferably to a maximum of 5%. It is possible in this way for the adjustment or implementation of the specified maximum group power output to be performed substantially by the fixed control term and hence that this implementation can be carried out substantially by means of a control system. The variable control term and hence the control term should involve only minimal readjustments, as far as possible. This proposal has the advantage that, by implementation being predominantly performed by means of a controller, the specified maximum group power output can be implemented quickly and without oscillations. The variable term can be used, in particular, to achieve steady-state accuracy.

The setpoint/actual value comparison between the specified maximum group power output and the fed-in group power output at the grid connection point is preferably taken into account as a control error, namely in the control engineering sense, in particular. It is proposed, in particular, that the control error is used as a normed value.

It is further proposed that the variable control term includes an integral term of the control error, wherein the integral term obtained from the control error is determined by integration or by an integrator using an integration factor. To that extent, the variable control term or at least a part of the integral control term forms an integral-action controller. By selecting the integration factor, the integration time constant and thus the speed of this integrating controller, i.e., of the integral-action controller, can be influenced or adjusted.

It is proposed, in particular, that the integration factor depends on the amplitude of the control error. It is proposed that the integration factor is preferably selected as being all the greater, the greater the magnitude of the control error. Relatively large differences can be quickly corrected in this way. However, if the differences are small, then fast correction is no longer needed, because the specified maximum group power output has been substantially reached. However, some noise components may then become dominant and excite the controller, thus triggering changes in the control value even though there is no change. This problem can be solved or at least mitigated by reducing the integration factor at low control error values.

According to another embodiment, the integral term is limited to a fraction of a maximum value of the control value, wherein the fraction is preferably in the range between 5% and 20% of the maximum value of the control value. In particular, it is 10% of the maximum value of the control value. If the control value is specified as a percentage value, the maximum value of the control value is 100%. This limitation ensures that the integral component does not in any case become too large, i.e., that upward integration is not excessive. This prevents the integral term from becoming too dominant and allows the basic characteristic of the control term is kept, namely to act like a control without feedback.

In addition or alternatively, it is proposed that the variable control term, after a change in the specified maximum group power output, in particular after a change by a value greater than a specified change limit, is determined with a time delay, and/or is supplied with a time delay. Full determination or full cut-in is initially delayed, at least. Such a time delay can be in the range between 1 and 20 seconds, in particular in the range between 2 and 10 seconds.

This ensures that, after a change in the specified maximum group power output, which in control engineering terms is mostly expressed as an input jump, in any case when the specified maximum group power output is not changed continuously, any dominance of the integral term and/or excessive upward integration is prevented. Such an input jump results in a correspondingly large control error, which in turn would lead to a rapidly increasing integral term in the integral controller. Thus, due to the proposed time delay, the integral term is initially inactive. During that time, and after the change in the specified maximum group power output, the fixed part of the control value can be determined from the control relationship and set. After the time delay, the variable control term, in particular the integral term or integral controller, then receives only a small control error, because due to the fixed control term, the group power output already has approximately the value of the specified maximum group power output.

Excessive dominance of the integral term can also be prevented, therefore, by this proposed determination and/or addition of the variable control term. This time delay is preferably only activated when the change is by a value which is greater than a specified change limit. This allows small jumps to be neglected. It also prevents the function being inadvertently triggered in the event of measurement noise. The specified change limit is preferably chosen in the range between 3 and 15%, in particular between 5 and 10%, relative to the installed capacity of the wind turbine group, or the nominal group power output.

The variable control term is preferably determined with the aid of an integrator, and an output value of the integrator is reset whenever there is a change, in particular an abrupt change, in the maximum group power output. This prevents an old upwardly integrated value that forms the output of the integrator from initially forming or dominating the variable control term. This particularly exploits the fact that the specified maximum group power output does not form a physical input value, but is transmitted as a specified default value or is otherwise present as information that can be evaluated in an evaluation logic unit and which allows a targeted intervention on the integrator. In this way, the integrator can be adjusted in a targeted manner after a change in the specified maximum group power output, in particular after an abrupt change. However, an input jump can also be detected and identified elsewhere.

A wind turbine group is also proposed. Such a wind turbine group has a plurality of wind turbines. A group computer having a group controller is also provided to control the wind turbine group, The group controller is configured to control the wind turbine group, in particular the infeed of power from the wind turbine group into an electrical supply network, in such a way as has been described in the foregoing, according to at least one embodiment of the method of controlling a wind turbine group.

A method of controlling a wind farm having a plurality of wind turbine groups is proposed, wherein a method according to any one of the embodiments described in the foregoing is used to control each wind turbine group. According to this method, a maximum farm power output is specified in order to limit a farm power output fed to the grid at the grid connection point. This maximum farm output power is subdivided into a plurality of maximum power output fractions in accordance with a distribution rule, and each of the wind turbine groups receives one of the plurality of maximum power output fractions as a maximum group power output. In other words, the maximum farm output power is subdivided according to a distribution rule into a plurality of maximum group power outputs. Depending on its maximum group power output, each of the wind turbine groups is then controlled by a method according to at least one embodiment of the method of controlling a wind turbine group, as described above.

In this regard, it is proposed, in particular, that a wind farm which is limited in accordance with a specified maximum farm output power does not distribute that limit to all the wind turbines in the wind farm, but subdivides that maximum farm output power into a plurality of maximum group power outputs that are also different, in particular. Each wind turbine group can then control its group power output as described above, depending on the maximum group power output it has individually received.

It is proposed, in particular, that the distribution rule splits the maximum farm output power into maximum power output fractions, depending on a group power output of each wind turbine group, a status of each wind turbine group and/or depending on an operational condition of each wind turbine group.

This is based, in particular, on the realization that, in the event of a power limitation, it does not necessarily make sense to limit all the wind turbines in the wind farm in equal measure or to specify the same limit values for all the wind turbines in the wind farm. There may be different situations and/or interests and/or regulations to be taken into consideration, without a central wind farm control system needing to specify a single control value to every single wind turbine. The control system for the wind turbine groups described in the foregoing can be used here, thus allowing fast implementation of the maximum group power output that is respectively specified, as well as fast implementation of the specified maximum farm output power.

The distribution rule that splits the maximum farm output power into maximum power output fractions depends preferably on a nominal group power output of each wind turbine group. The nominal group power output is the sum of all the nominal power outputs of the wind turbines in the wind turbine group. This allows a simple distribution rule to be established.

Alternatively, and in particular additionally, it is proposed that the distribution rule splits the maximum farm output power into maximum power output fractions depending on a status of each wind turbine group. This also involves taking into account the status of each individual wind turbine in the respective wind turbine group. Particular consideration can be given here, for example, to the fact that a wind turbine in the wind turbine group is not in operation due to maintenance work, or must be operated at a reduced level due to other regulations. Although this can be taken into account when implementing the maximum group power output in the respective control values, it is proposed here that it be taken into account when distributing the maximum farm output power. Especially when a wind turbine is not operational, the respective wind turbine group as a whole can only feed in less power overall, and for that reason it is proposed that this be taken into account when distributing the maximum farm output power among the individual maximum group outputs.

It is also or alternatively proposed that the distribution rule splits the maximum farm output power into maximum power output fractions depending on an operational condition of each wind turbine group. An operational condition can be a deliberate reduction of the wind turbine, for example. Its generated output power is also an operational condition, so the total power generated by all the wind turbines in the wind turbine group is also an operational condition of each wind turbine group. By taking into account the operational condition of each wind turbine group, it is thus possible to also take into account a single operational condition of one wind turbine in the wind turbine group.

This is based, in particular, on the realization that a wind farm may have a plurality of wind turbine groups that collectively feed power into the electrical supply network at the same grid connection point, but are operated by different operators and/or are of different turbine types and/or originate from different wind turbine manufacturers.

If, for example, the operator of one of the wind turbine groups intends to provide his wind turbines as grid support and therefore does not intend to feed in the maximum power output, whereas another operator of a different wind turbine group in the same wind farm wants instead to feed in as much power as possible, then this can be taken into account in the distribution rule for splitting the maximum farm output power into the maximum power output fractions. In the example mentioned, the maximum farm output power, which constitutes a limitation, can be mainly passed on to the wind turbine group of the operator who mainly wants to provide support power and who does not want to feed in the maximum power. The other operator, who wants to feed in the maximum power, can benefit from this arrangement. In the event that the wind farm output is reduced by specification of the maximum farm output power, he can then feed in more power when that maximum farm output power is distributed unevenly. He can benefit from the other operator not wanting to feed in the maximum power.

However, other possibilities are also conceivable, for example that a wind turbine group is close to a residential area and is operated at reduced speed for noise protection reasons. In that case also, it may make sense to split the maximum farm output power in such a way that the wind turbines that have to be operated at reduced speed anyhow are also given a greater limitation as a limit value, because despite that the power they generate does not have to be reduced any further anyhow. Here again, the wind turbine group can benefit that is able at that moment to feed in power at an unreduced rate. Such noise reduction regulations can also depend on the direction of the wind, as may the fact that another wind direction may require a different wind turbine group to be operated with reduced power output. This, too, could be taken into account in the distribution rule.

A wind farm having a plurality of wind turbine groups is also proposed, namely such wind turbine groups according to at least one embodiment as described in the foregoing.

Such a wind farm comprises a plurality of wind turbine groups, and the grid connection point at which all the wind turbines in the wind farm and thus all the wind turbine groups feed power into the electrical supply network. A central wind farm computer is also provided, which can also be referred to synonymously as a central wind farm controller, and which is configured to perform at least one method of controlling a wind farm, namely a method according to at least one of the above embodiments describing a method of controlling a wind farm.

BRIEF DESCRIPTION OF THE SEVERAL
VIEWS OF THE DRAWINGS

Exemplary embodiments of the invention shall now be described in greater detail with reference to the accompanying Figures, in which FIG. 1 shows a perspective view of a wind turbine.

DETAILED DESCRIPTION

Figure 1:
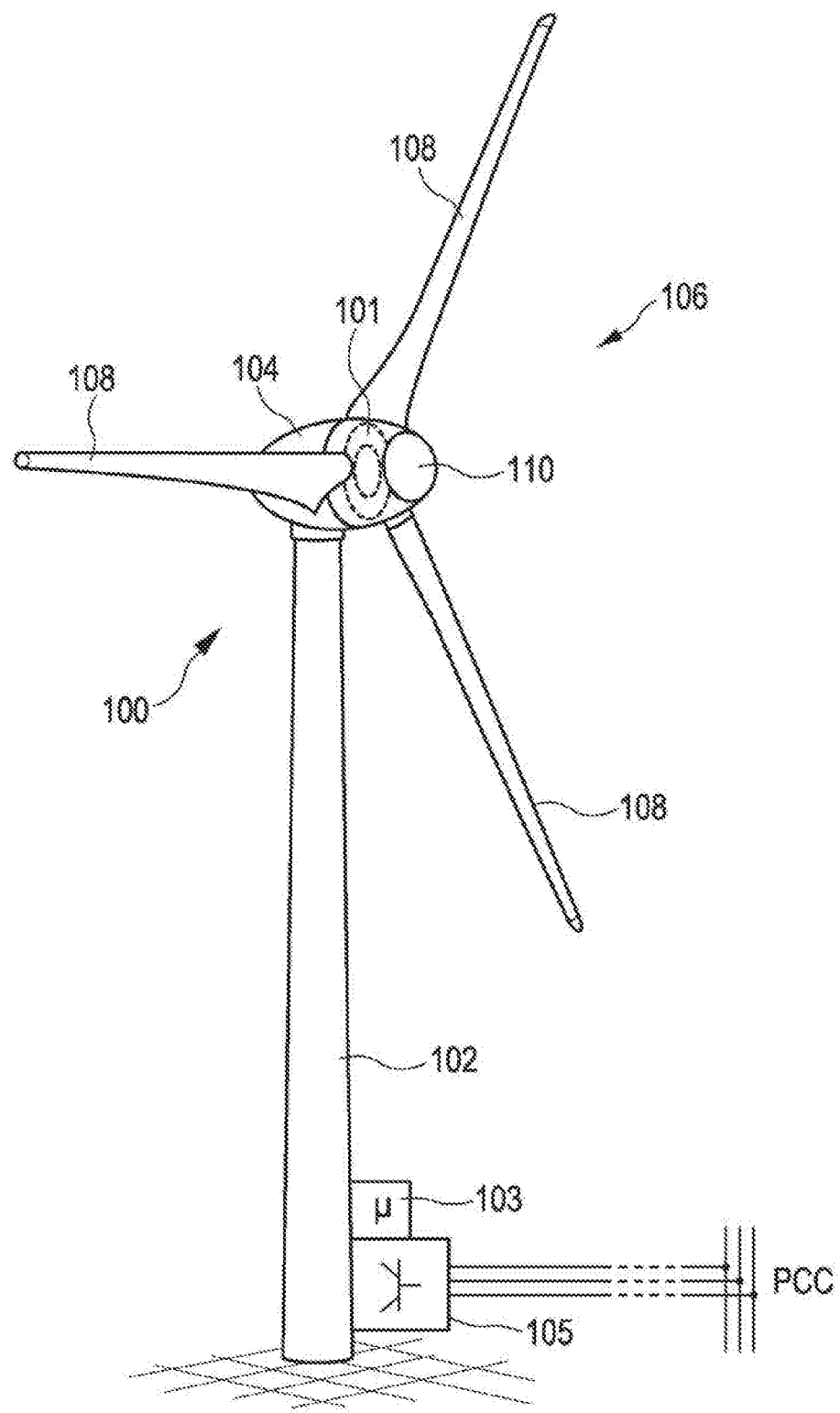

FIG. 1 shows a wind turbine 100 comprising a tower 102 and a nacelle 104. A rotor 106 having three rotor blades 108 and a spinner 110 is arranged on nacelle 104. Rotor 106 is made to rotate by the wind and drives a generator in nacelle 104 as a result.

Wind turbine 100 has an electric generator 101, which is indicated in nacelle 104. Electric power can be generated by means of generator 101. An infeed unit 105, which can be in the form of an inverter, is provided for feeding electric power into the grid. This can be used to produce a three-phase infeed current and/or a three-phase infeed voltage having an amplitude, a frequency and a phase, for feeding into the grid at a grid connection point PCC. That can be done directly, or also collectively with other wind turbines in a wind farm. A system controller 103 is provided to control wind turbine 100 and also infeed unit 105. System controller 103 can also receive externally specified values, in particular from a central wind farm computer.

Figure 2:
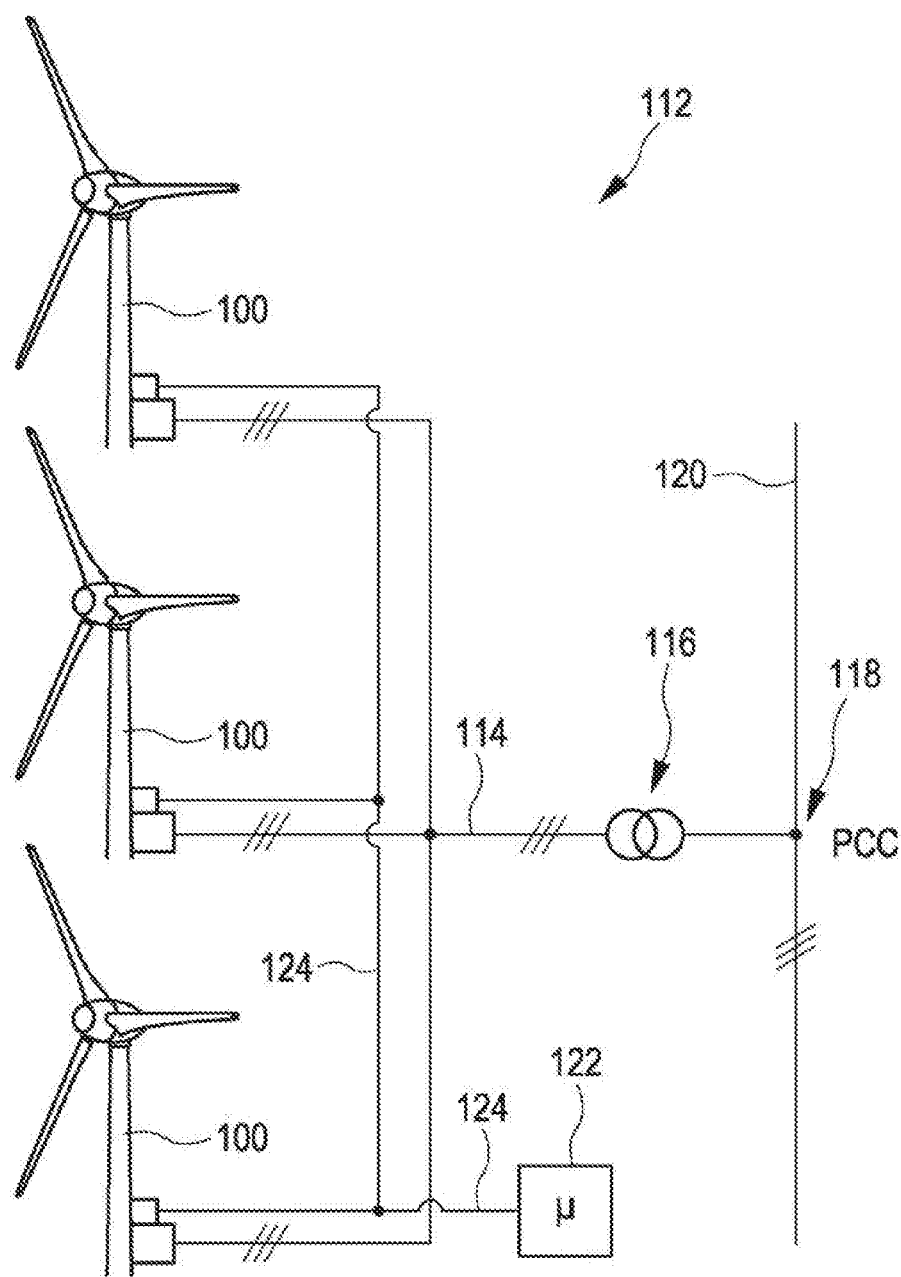
FIG. 2 shows a schematic view of a wind farm.

FIG. 2 shows a wind farm 112 comprising, in this example, three wind turbines 100, which may be identical or different. The three wind turbines 100 are thus representative of basically any number of wind turbines in a wind farm 112. Wind turbines 100 deliver their power, namely the generated current, via an electrical wind farm network 114. The respective current or power outputs respectively generated by the individual wind turbines 100 are added up, and a transformer 116 is usually provided that transforms the voltage in the wind farm in order to feed it into supply network 120 at infeed point 118, which is also referred to generally as the point of common coupling (PCC). FIG. 2 is only a simplified view of a wind farm 112. Wind farm network 114 may be designed differently, for example by a transformer also being provided at the output of each wind turbine 100, to mention just one other embodiment.

Wind farm 112 also has a central wind farm computer 122, which can also be referred to synonymously as the central wind farm controller. This can be connected to wind turbines 100 via data lines 124, or wirelessly, so as to exchange data with the wind turbines via those connections, in particular to receive measured values from wind turbines 100 and to transmit control values to wind turbines 100.

FIG. 2 thus shows a wind farm 112 having three wind turbines 100 in the example shown here. These three wind turbines 100 can form a wind turbine group. Wind farm 112 can thus comprise a total of one wind turbine group. Each of these wind turbines 100 can therefore generate an electrical power output as its wind turbine output power, and these wind turbine power capacities are added up in wind farm network 114 to form a group power output, and this group power output can be fed into the electrical supply network 120 at grid connection point 118.

In order to specify and comply with a maximum for this group power output, such a maximum group power output can initially be given to the central wind farm computer 122 externally, for example by a grid operator. The central wind farm computer 122 can then determine a control value on the basis of a control relationship and transmit it to wind turbines 100 via data lines 124 or, alternatively, wirelessly. To that end, a control relationship is determined in the central wind farm computer 122 and is then used to determine the control value. The control value is thus determined in wind farm computer 122 using the control relationship that is also determined there, and depending on the specified maximum group power output, and is transmitted to wind turbines 100.

Figure 3:
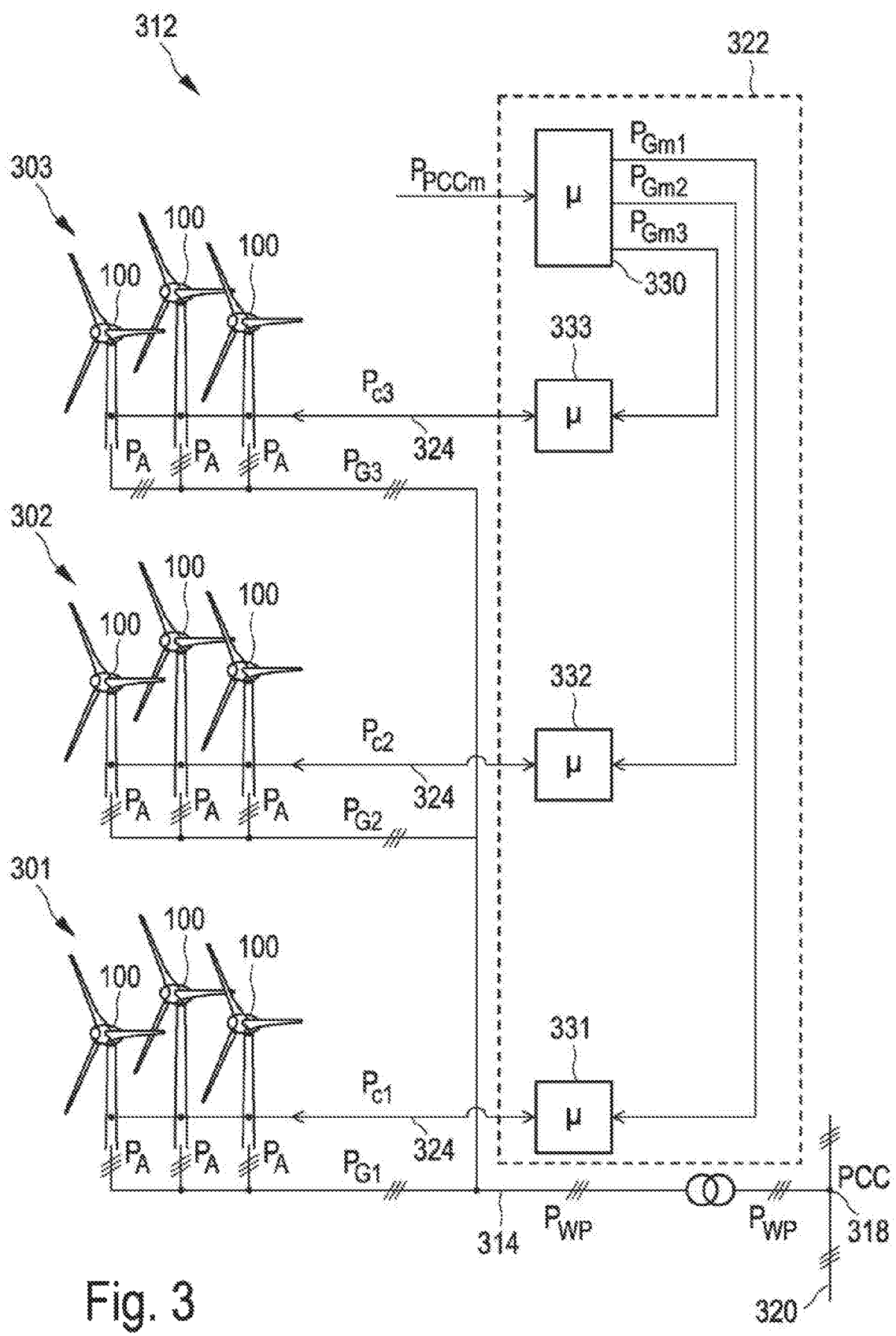
FIG. 3 shows a schematic view of a wind farm comprising three wind turbine groups.

FIG. 3 shows a wind farm 312 comprising three wind turbine groups 301, 302 and 303 in this example. Each wind turbine group 301, 302 and 303 has a plurality of wind turbines 100. According to FIG. 3, each wind turbine group contains three wind turbines, but this should be understood as an example only, and each wind turbine group can have any other number of wind turbines, and the number of wind turbines can also differ between the wind turbine groups. There may also be more or fewer wind turbine groups. Wind turbines 100 can be the same as wind turbine 100 in FIG. 1 or like a wind turbine 100 in FIG. 2, so reference sign 100 was chosen in FIG. 3 also, for the sake of simplicity. However, wind turbines 100 may also differ from each other, not only within a wind turbine group, but also from one wind turbine group to another.

Each wind turbine 100 generates a wind turbine output power $P_A$. The respective wind turbine power outputs $P_A$ may differ, of course, and an individual index has been refrained from here for the sake of clarity. The sum of wind turbine power outputs $P_A$ of a wind turbine group 301, 302 and 303 forms the respective group power output $P_{G1}$, $P_{G2}$ and $P_{G3}$, respectively. These group power outputs $P_{G1}$, $P_{G2}$ and $P_{G3}$ are likewise added up in wind farm network 314, namely to form the wind farm power output $P_{WP}$. This wind farm power output $P_{WP}$ is then fed into the electrical supply network 320 at grid connection point PCC. In the illustrative view shown in FIG. 3, any power losses are neglected. The wind farm power output $P_{WP}$ fed into electrical supply network 320 at grid connection point PCC is therefore the sum of group power outputs $P_{G1}$, $P_{G2}$ and $P_{G3}$.

In order to limit the wind farm power output $P_{WP}$ at grid connection point PCC, also marked with reference sign 318, a limiting signal specifying a maximum farm output power $P_{PCCm}$ can be specified externally. This maximum farm output power $P_{PCCm}$ can be entered for this purpose in a distribution module 330. Distribution module 330 can split this maximum farm output power $P_{PCCm}$ into individual maximum power output fractions, namely maximum group power outputs $P_{Gm1}$, $P_{Gm2}$ and $P_{Gm3}$. These individual maximum group power outputs are transferred to corresponding group modules 331, 332 and 333 assigned to the respective wind turbine group.

Depending on the respectively specified maximum group power output $P_{Gm1}$, $P_{Gm2}$ and $P_{Gm3}$, each of these group modules 331, 332 and 333 then determines a control value $P_{C1}$, $P_{C2}$ and $P_{C3}$. These control values are then transmitted to the respective wind turbines in the relevant wind turbine group, namely via data lines 324, which are all marked with the same reference sign for the sake of simplicity. These data lines 324 can also be used to obtain information on the individual wind turbines, in particular status information, operating values and measured values.

The structure of distribution module 330, together with group modules 331, 332 and 333, is for illustration purposes, and these modules can also be combined in a process control computer/controller, for example. Whether separate or in combination, they can in any case, and preferably together, be part of the central wind farm computer 322, which is therefore marked as a broken-line rectangle containing the group modules and the distribution module.

Figure 4:
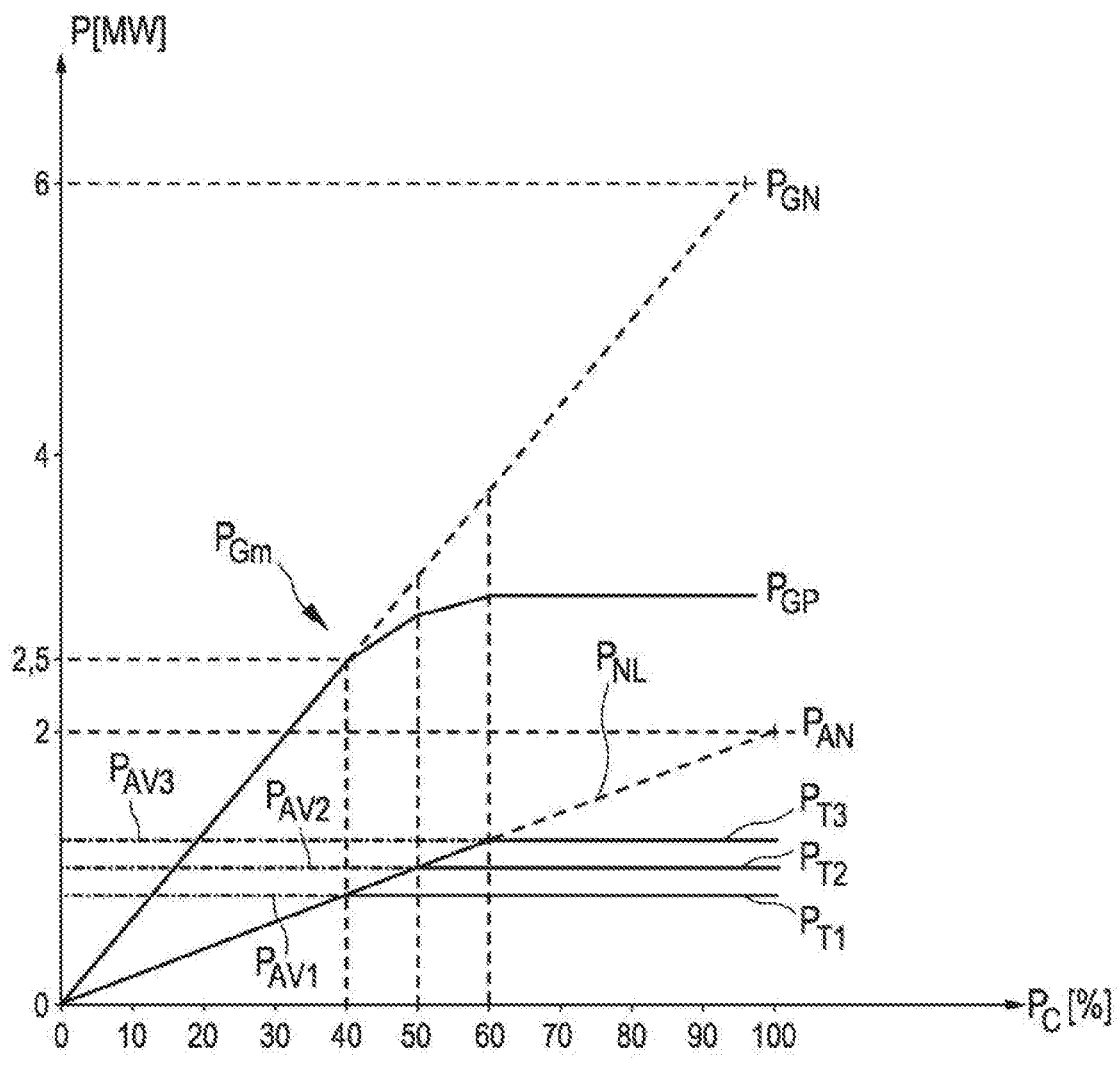
FIG. 4 shows a diagram illustrating the creation of a control relationship.

FIG. 4 shows an illustrative diagram that is meant to explain the control relationship and how it is determined. FIG. 4 is based on a simplified example of a wind turbine group comprising three wind turbines each having a nominal power rating of 2 MW. This results in a nominal power of 6 MW for the group power output, i.e., a nominal group power output of 6 MW.

The control value $P_C$ is shown as a percentage on the x-axis of the diagram. The control values of 0-100% are potential control values in this respect, because they can be selected as the control value in each case. The power output P is entered on the y-axis in MW. This power output may relate to the group power output or also to the power output of a single wind turbine, depending on which value or curve is shown. The curve for the potential group power output $P_{GP}$ basically represents the result of the control relationship to be determined. This curve for the potential group power output $P_{GP}$ is calculated as follows.

For each potential control value $P_C$, an associated value of the potential group power output $P_{GP}$ is calculated as follows. 101 or 100 control values can be used, for example, namely values from 0% or 1% to 100%, in 1% increments.

For each potential control value, the potential group power output is calculated as the sum of the power outputs that can theoretically be generated by each of the wind turbines in the wind turbine group given the respective control value. The power that can theoretically be generated by a wind turbine is either a nominally limited power output $P_{NL}$ or an available power output $P_{AV}$. The smaller of the nominally limited power output $P_{NL}$ and the available power output $P_{AV}$ is used in each case as the power output that can theoretically be generated. The nominally limited power $P_{NL}$ is the product of the respective control value $P_C$ and the nominal power output of the respective wind turbine. The nominally limited power output $P_{NL}$ in the diagram in FIG. 4 thus forms a diagonal from the origin to its nominal power output $P_{AN}$ at a control value of 100%. This diagonal is drawn as a broken line in FIG. 4, the broken line being partly covered by a solid line that will be discussed further below. As the three wind turbines examined here by way of example have the same nominal output power, namely $P_{NL}$=2 MW, there is also one diagonal only.

The available power output $P_{AV}$ is the power that the wind turbine could generate, on the basis of the prevailing wind conditions, if it is not being subjected to limitation. Such limitation could also result from an earlier or current value of a specified maximum group power output for limiting the group power output. If the wind turbine is not operated with a limitation, the currently available power is the power that is actually being generated at that moment. Instead of calculating the available power, it is possible to that extent to take the actually generated power as the available power.

In the illustrative example in FIG. 4, it is assumed that the three wind turbines have different available power outputs. This may be due, for example, to the fact that the wind turbines receive different strengths of wind depending on their position in the wind farm, for example because one of the wind turbines is in a more exposed position than another of the wind turbines. For that reason, accordingly, three different power outputs are also drawn into FIG. 4, namely as $P_{AV1}$, $P_{AV2}$ and $P_{AV3}$. The value of the respective available power does not depend on the control value $P_C$ and for that reason these three available power outputs $P_{AV1}$, $P_{AV2}$ and $P_{AV3}$ are drawn as horizontal dot-dash lines, unless they are covered by a solid line.

The power that can theoretically be generated is thus selected for each individual wind turbine at each control value $P_C$ as the smaller value between the nominally limited power output $P_{NL}$ and the available power output $P_{AV1}$, $P_{AV2}$ and $P_{AV3}$. This results in the three solid lines for the respective power $P_{T1}$, $P_{T2}$ and $P_{T3}$ that can theoretically be generated. These lines initially coincide with the nominally limited power $P_{NL}$, and then the respective value of the available power $P_{AV1}$, $P_{AV2}$ or $P_{AV3}$.

The potential group power output $P_{GP}$ is then the sum of these three individual power outputs that can theoretically be generated. It is calculated as the sum of these three power outputs that can theoretically be generated for each control value $P_C$.

Depending on the potential control value $P_C$, the result can therefore be represented by the characteristic curve of the potential group power output $P_{GP}$. For practical implementation purposes, the values of this characteristic curve of the potential group power output $P_{GP}$ can be stored in a table along with the respective potential control value $P_C$ as a pair of values, and this table can then be regarded as a control relationship.

In order to now determine an associated control value $P_C$ as a function of a specified maximum group power output, this specified maximum group power output can be looked up on the characteristic curve for the potential group power output $P_{GP}$ shown in FIG. 4, or in a corresponding table, and the associated potential control value $P_C$ can be read off and used as control value $P_C$. For example, if a value of 2.5 MW is specified as the maximum group power output for the example illustrated in FIG. 4, then this value is found on the characteristic curve for the potential group power output $P_{GP}$ at a control value $P_C$ of 40%. This illustrative example is shown as marked in FIG. 4 as the maximum group power output $P_{Gm}$.

It can be read from the curve of the potential group power output $P_{GP}$ that it no longer increases once a potential control value $P_C$ is reached. The associated potential control value $P_C$ is referred to as the threshold control value $P_{CL}$ and is stored additionally as information. Complying with this threshold control value $P_{CL}$ prevents excessively large control values $P_C$ being used, which could no longer be reached at all due to the horizontal part of the curve for the group power output $P_{GP}$. The threshold control value $P_{CL}$ is preferably chosen slightly higher than the first value of the control value after which the group power output $P_{GP}$ no longer increases. By this means, it is possible to ensure that the power to be fed into the grid is not inadvertently limited to an unnecessarily strong extent when there are slight changes in the power situation.

To actually control the wind turbines in the case of a specified maximum group power output, an appropriate control value can thus be determined in the manner described with reference to FIG. 4. However, the control value can be supplemented by a variable term, in particular by an integral term. In this case, the control value may be composed of a fixed term and a variable term. The fixed term is obtained from FIG. 4 in the manner described. Purely for the sake of simplicity, FIG. 4 and the descriptions above assumed the control value $P_C$ and does not specify that the fixed term of the control value is in fact determined in accordance with FIG. 4. In the case where no variable term is used, the control value as a whole and the fixed term of the control value can be identical.

The variable term may result from a control arrangement, in particular from a setpoint/actual value comparison in which the specified maximum group power output is compared with the actually generated group power output. A control error resulting from the difference between said setpoint and actual value is preferably entered via a controller, in particular via an integrator or a controller that includes an integrator.

Figure 5:
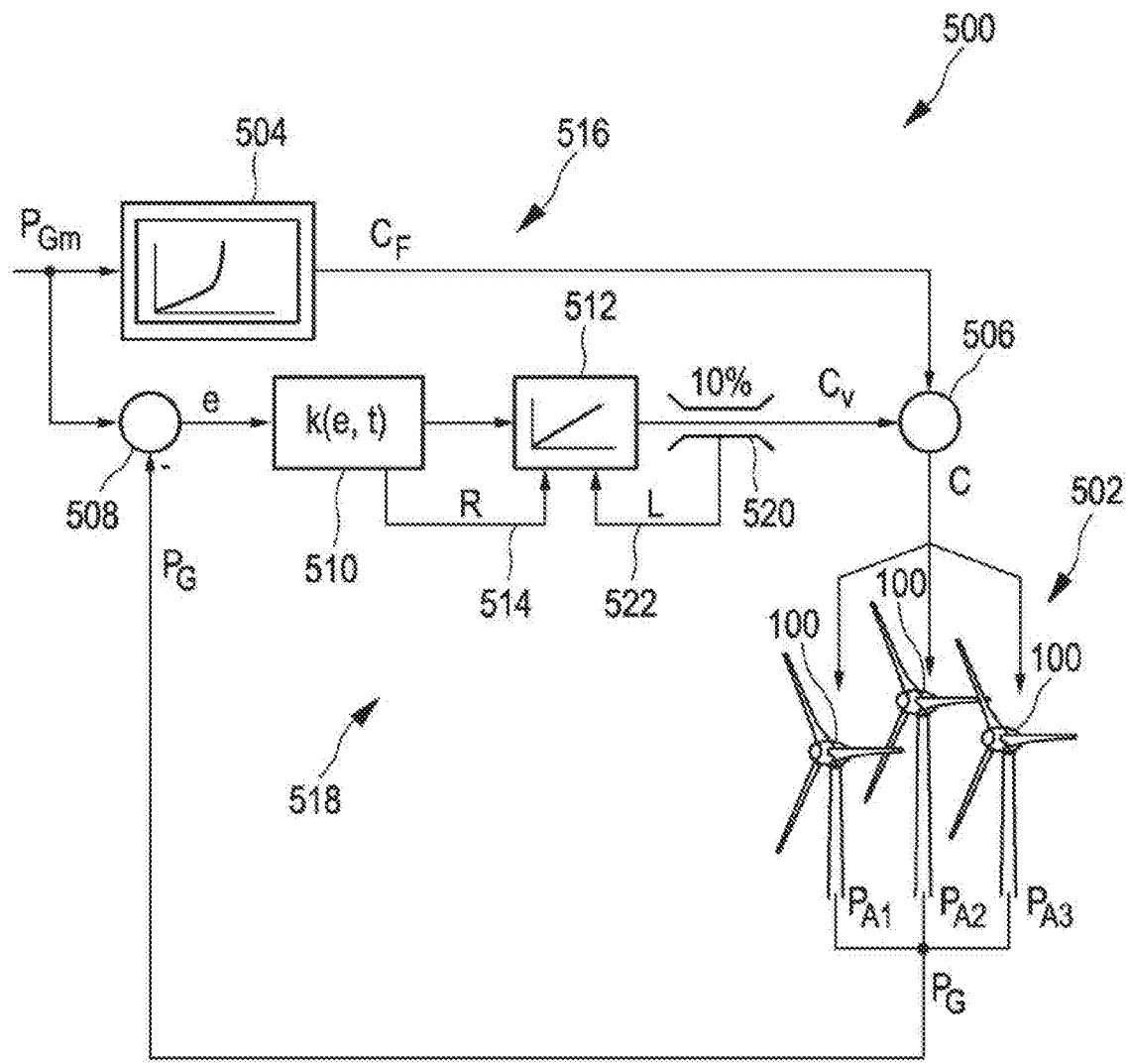
FIG. 5 illustrates a control structure for controlling a wind turbine group.

FIG. 5 illustrates a control structure 500 (controller) for controlling a wind turbine group 502. By means of control structure 500, wind turbine group 502 is to be controlled in such a way that it maintains a specified maximum group power output $P_{Gm}$. This specified maximum group power output $P_{Gm}$ thus forms an input variable or an input value for this control structure. This specified maximum group power output $P_{Gm}$ is entered into control block 504. Control block 504 contains a control relationship. This control relationship assigns a control value to a maximum group power output that has been entered. To that end, control block 504 can basically have a reverse relationship to the diagram in FIG. 4 or a reverse assignment between the potential group power output and the potential control value. The input variable of the relationship stored in control block 504 is not the control value, therefore, but the group power output. This is indicated by the symbol in control block 504.

This means there is a clear assignment between the group power output that has been entered and the control value that results. The resultant control value is fixed, therefore, and is thus referred to as $C_F$ in the control structure 500 of FIG. 5. Control block 504 thus outputs a fixed control term $C_F$ of a control value C. The fixed control term $C_F$ is outputted as a percentage value. In summing element 506, the fixed control term $C_F$ is added to a variable control term $C_V$, described below, to form control value C. The variable control term $C_V$ and also control value C are likewise provided in the form of percentage values.

The control value C is then passed on to the individual wind turbines 100. The individual wind turbines 100 respond by adjusting their power generation accordingly, and they generate a wind turbine output power $P_{A1}$, $P_{A2}$ and $P_{A3}$, respectively. These power outputs may be equal, but for practical reasons alone may differ at least slightly. They are combined and together, i.e., in total, form the group power output $P_G$. This group power output $P_G$ is also fed into an electrical supply network, of course, whereby control structure 500 in FIG. 5 does not play a crucial role in that regard, so it is not shown.

To determine the variable control term $C_V$ in the difference element 508, the generated group power output $P_G$ is subtracted from the specified maximum group power output $P_{Gm}$ to form a control error e. This control error e is initially routed via a gain block 510 with variable gain k (e, t). The result is then fed to an integrator 512. The variable gain factor k (e, t) can thus be understood as an integral gain factor, or as a gain factor of integrator 512. Its inverse can be understood as an integration time constant. However, in order to highlight the manifold importance of this variable gain factor k (e, t), this gain block 510 is drawn as a separate element.

The variable gain factor k (e, t) therefore depends on control error e and also on time. Not only is control error e multiplied by a factor k, therefore, but such a factor depends also and additionally on control error e. To that extent, one can also speak of a nonlinear gain, because it depends on the amplitude of its input signal. It is proposed, in particular, that the gain is selected as being all the greater, the greater the magnitude of the control error. The variable gain factor k (e, t) can also be referred to synonymously as an integration factor.

The variable gain factor k (e, t) is also dependent on time, and this dependency on time is provided, in particular, so that the gain factor k (e, t) initially takes a very small value after a jump in the control error, which value can also be zero, or less than 10% of an otherwise smallest value of the variable gain factor k (e, t). In this case, this small value, or even the value zero, is provided for a short period of time, in particular for 10 seconds or less. This is based on the idea that a jump in the control error e can only be caused by a jump in the specified maximum group power output $P_{Gm}$, because for physical reasons it is not possible for the actually generated wind farm power output $P_G$ to jump, apart from a safety device being triggered, which would lead, however, to an error anyhow and to an error signal.

A jump in the control error e thus means that a new value is specified for the maximum group power output. In that case, integrator 512 should not perform any upward integration initially. Integrator 512 is preferably reset, in addition, after such a jump in control error e. This is indicated by a reset line 514. This is meant to indicate that gain block 510, which has detected such a jump in control error e, also passes this information to integrator 512, so that the latter can be reset.

In any case, the variable gain factor k (e, t) is so small shortly after the jump in the control error, i.e., a short time after a change in the specified maximum group power output, that integrator 512 is effectively inactive. In that period, ideally, the value zero or at least a very small value is also the result for the variable control term $C_V$.

However, determination of the fixed control term $C_F$ is not inactive, but said fixed control term $C_F$ is recalculated immediately after the change in the maximum group power output, instead, in accordance with the stored control relationship. Immediately after the change in the specified maximum group power output $P_{Gm}$, an assigned fixed control term $C_F$ is determined, and that should already be a good value for controlling wind turbine group 502. The total control value C, therefore, is initially equal, when the variable control term $C_V$ is zero or negligible, to the fixed control term $C_F$.

The wind turbines 100 in wind turbine group 502 then have time to adjust their wind turbine output power $P_{A1}$, $P_{A2}$ and $P_{A3}$ to the new total control value C. In other words, only control branch 516 is meant to be initially active at the beginning of a changed maximum group power output. This prevents integrator 512 from performing an upward integration too quickly, in response to such an abrupt change in the specified maximum group power output, to a large value that must then be reduced again. In other words, control branch 518 should be as inactive as possible at the beginning of a changed maximum group power output. The result is that the specified maximum group power output is substantially implemented by the control branch and thus by a controller in the first place, and that the control branch, in particular the integral controller, regulates only minor deviations, in particular that a steady-state accuracy is achieved which, of course, can hardly be achieved by a controller.

In this sense, integrator 512 generates an output signal, once the initial period has elapsed, for regulating any residual deviation and for achieving steady-state accuracy. In order to also ensure that the integral term or control branch 518 is not too dominant in implementing a specified maximum group power output, a limiting element 520 is also provided. This limiting element 520 thus limits the output of integrator 512. A value of 10% is stated there by way of illustration, and this is meant to mean that the variable control term $C_V$ is 10% at a maximum. However, this is an example, and it is preferable even that the variable control term $C_V$ take a maximum value of only 5%.

Limiting element 520 is also to be understood symbolically in this respect, in that not only is the output of integrator 512 to be limited, but the integrator 512 itself is then to cease performing any upward integration. For that purpose, a limiting feedback loop 522 is symbolically provided to illustrate that this limitation of the output variable is actually intended to limit integrator 512.

Aspects shall now be described with reference to further examples.

The proposed method comprises two components:

1. A control component that determines a fixed control term of the control value by means of an auxiliary table, and 2. a slow integral-action controller that still performs the fine adjustment using a setpoint/actual value comparison and determines a variable control term of the control value.

It is proposed that a central wind farm controller sends all the wind turbines in the wind farm one and the same control value for the active power to be set. This control value is distributed as a broadcast to all the wind turbines. It is referred to as a control value, but due to the power output of the wind turbines being dependent on the wind, it is really a power limitation value (Pmax). This is because the wind turbine can limit its power output, but cannot increase it arbitrarily. The maximum power output depends primarily on the wind, and then on other limitations such as the apparent power to be complied with, the temperatures to be complied with, the noise levels to be complied with, technical availability, etc.

However, it is also possible that the wind turbines in a wind farm are subdivided into a plurality of wind turbine groups, which can also be referred to as cluster control. The concept there is that the wind park be virtually subdivided into groups, and that each group receives its own specified value, namely its own maximum group value, which also constitutes a Pmax value.

The idea of controlling by means of a control relationship that can be stored in a table, which can be called an auxiliary table, works for both types of control—not only when there is one control value for all, but also in the case of cluster control.

Further information: The control value sent to the wind turbines is a setpoint percentage value and relates in each case to the nominal power of the respective wind turbine.

The auxiliary table for the fixed control term can be created in the following manner.

The central wind farm controller communicates constantly with each wind turbine. Control values are sent and current operating data are received. Obtaining a complete map of the relevant data from the wind farm takes up to one second.

Three variables are relevant for this procedure:

1. The availability of the wind turbine indicates whether the turbine is in order and ready to feed power to the grid. This also includes whether communication with the central wind farm controller is in order, etc.

2. The current wind turbine output power refers to the active power currently fed-in by the wind turbine.

3. The available power from the wind turbine indicates the available active power of the wind turbine that the wind turbine could generate and feed into the grid if it did not have to comply with certain limitations.

The wind turbine supplies the following four signals:

The power output that can currently be generated from the prevailing wind.

A technically available power output that takes into account current technical conditions, for example the fact the technically available active power can decrease when a converter is deactivated.

A power output that can still be generated and fed into the grid, depending on extreme environmental conditions such as a storm, and which can also be referred to, therefore, as power output dependent on force majeure.

An externally specified maximum power output, which can be referred to as the maximum available power after taking an externally specified limitation or control into account. This also includes a limitation or control caused by specification of a maximum group power output.

A nominal power of each wind turbine can preferably be transmitted as well, although it suffices to transmit seldom, for example only once a day.

The available power that is relevant for the proposed method is the minimum value resulting from the power that can currently be generated from the prevailing wind, the technically available power and the power dependent on force majeure. The externally specified maximum power does not limit the value used as the available power, because the control value of the proposed control method is itself included here and is distorted as a result.

A table, namely the control relationship, is continuously produced in the background, independently of the power control being performed. This table contains two items of information in each case: A virtual control value (ranging from 0 to 100%), which can also be referred to synonymously as the potential control value, and a theoretical active power output of all the wind turbines and matching the control value, which can be referred to as the potential group power output.

The procedure for this is as follows:

In one pass, a potential control value, for example 10%, is specified. The theoretical power output is then calculated for all the wind turbines. To do that, a check is performed to determine whether the wind turbine is available. If it is, then the potential control value is multiplied by the nominal power of the wind turbine to obtain an absolute value for the output power. This output power is compared with the available active power, which can also be referred to simply as the available power. The smaller power value is taken as the theoretical power. This calculation is performed and added up for all the wind turbines in the wind farm or wind turbine group. In the end, for a potential control value of 10%, the table indicates a potential group power output of XXX kW as the sum of the theoretical active power outputs of all the wind turbines in the wind farm, for example 1870 kW. On the next pass, the virtual control value or potential control value is increased, for example to 11%, and the calculated is performed once again. The sum of all the theoretical power outputs, i.e., the potential group power output, could then be 2050 kW, for example. This calculation is performed for all the virtual control values or potential control values ranging from 0% to 100%.

In the background, a table is created in which a value for the potential group power output is obtained for all the virtual control values or potential control values.

After a complete run, an additional table for a simplified search is filled. This table can then be referred to as a reference table, has two entries in each case, and indicates the starting index for the first table in 10% increments, in relation to the installed capacity of the wind turbine group, in particular, which is the sum of the nominal power ratings of all the wind turbines in the wind farm. This is proposed for a simplified search so that it is not necessary to search through the entire first Table 1 while the controller is calculating. If the power output is to be limited due to the wind or other conditions, the maximum setpoint power output for a wind turbine, normed relative to its nominal power, is stored in the end as a threshold control value, preferably plus a reserve. This can be done in such a way that, from then on, the table is filled to the last entry with the threshold control value.

The result is a function that receives as input a setpoint power or maximum power, namely the maximum group power output, in particular as an absolute value, and that returns an ideal control value as its output.

In this function, the setpoint power is normed to the installed power, and the starting index for Table 1 is determined with the aid of Table 2.

A search algorithm that determines the best possible control value then begins in Table 1.

Starting with the starting index, each value for the sum of the theoretical power values, i.e., each value for the potential group power output, is looked at and compared with the setpoint power output. Another condition is that the value of the potential group power output must increase in comparison with the previous index, since otherwise the final value would have been reached. So if the power value increases relative to the previous index, and the power value is still lower than the setpoint power, then the index is increased. If one of the conditions is not met, the process stops. The auxiliary variables contain the index, the value of the potential group power output, i.e., the sum of the theoretical power values for the index, but where the power value is less than the setpoint power, and the potential group value, where the value is greater than the setpoint power. The ideal control value is then linearly interpolated between these values.

This control value is returned as the result of the function.

To illustrate this, the tables and a sample calculation (all idealized) are provided below:

The installed power capacity Pinst is calculated as the sum of the nominal power ratings of all the wind turbines in the wind farm or wind turbine group.

As an example, a wind farm containing five wind turbines each having a nominal power of 2000 kW, and five wind turbines each having a nominal power of 3000 kW, is assumed.

The installed capacity Pinst is calculated as 5*2000 kW+5*3000 kW=25000 kW.

The maximum available power, normed to the nominal power of a wind turbine, here in the example to one with a nominal power rating of 3000 kW, is 1740 kW⇒1740 kW*100%/3000 kW+5% reserve=63%. This, therefore, is the threshold control value.

With a control value of 63%, none of the wind turbines would operate with a limit, because the total available power of the wind turbines is below the 63% figure.

Example of Table 1 (the Index Corresponds to the Potential Control Value

| Index | Control value | Sum of the theoretical power outputs (potential group power output) |
|---|---|---|
| 0 | 0% | 0 KW |
| 1 | 1% | 250 kW |
| 2 | 2% | 500 kW |
| ... | ... | ... |
| 50 | 50% | 12500 kW |
| 51 | 51% | 12800 kW |
| 52 | 52% | 13050 kW |
| 53 | 53% | 13300 kW |
| 54 | 54% | 13500 kW |
| 55 | 55% | 13700 kW |
| 56 | 56% | 13880 kW |
| 57 | 57% | 13950 kW |
| 58 | 58% | 14000 kW |
| 59 | 59% | 14000 kW |
| ... | ... | ... |
| 100 | 100% | 14000 kW |

Detailed description of how to determine the theoretical power using the example of a virtual control value or potential control value of 2%.

Wind turbines can also be referred to synonymously as WTGs (wind turbine generators). It is assumed that a control value of 2% is sent to WTG 1. The WTG has a nominal power of 2000 kW*2%=40 kW. The available power is more than 40 kW, so 40 kW is taken as the theoretical power. WEAs 1 to 5 are identical. WTG 6 has a nominal power rating of 3000 kW. 3000 kW*2%=60 kW. In this case also, the available power is more than 60 kW. The same applies to the remaining turbines 7 to 10. This results in a total power output of 5 WTGs à 40 kW+5 WEAs à60 kW=500 kW total theoretical power, i.e., potential group power output. This value is entered in the table. The same calculation is then performed with a virtual or potential control value of 3%, and so on up to 100%.

When this is finished, Table 1 provides, for each potential control value, a sum total of all the theoretical wind turbine power outputs as a potential group power output. From the control perspective, however, this table is needed exactly the other way round. The controller would like to have the control value for a particular power output. This is the purpose of Table 2: In 10% increments, Table 2 provides a suitable entry point for Table 1, so that it is not necessary to search through the entire table. For a potential group power output, the table returns the starting index equal to the initial control value.

Note: From index 6 onwards, the maximum control value is found. This is the value that was obtained above on the basis of the maximum available output power of a WTG in the wind farm. If this control value is sent, all the wind turbines feed their maximum available power into the grid. More than that is not possible.

TABLE 2

| Index | $P_{SP}$ in % of Pinst | Starting index from Table 1 |
|---|---|---|
| 0 | 0% | 0 |
| 1 | 10% | 10 |

TABLE 2-continued

| Index | $P_{SP}$ in % of Pinst | Starting index from Table 1 |
|---|---|---|
| 2 | 20% | 20 |
| 3 | 30% | 30 |
| 4 | 40% | 40 |
| 5 | 50% | 50 |
| 6 | 60% | 63 |
| 7 | 70% | 63 |
| 8 | 80% | 63 |
| 9 | 90% | 63 |
| 10 | 100% | 63 |

Specimen calculation of the control value for a power output of, for example, 13550 kW:

Specified maximum group power output, or P_setpoint_%=13550 kW*100%/25000 kW=54.2%. Index 5

Calculation: P_setpoint_%/10 and rounded down 54.2%/10 and rounded down=5

Table 2 Index 5 returns a starting index of 50 for Table 1.

Table 1, starting index of 50 returns a potential group power output of 12500 kW.

The index is incremented until the setpoint power is reached, i.e., the specified maximum group power output of 13550 kW.

| | | |
|---|---|---|
| 54 | 54% | 13500 kW (P_temp1) |
| 55 | 55% | 13700 kW (P_temp2) |

Index 54 is less than the setpoint power, and index 55 is more. A linear interpolation between the two values is performed and a control value is determined with 0.1% accuracy:

Control value=(Index_P_temp1)+(Psetpoint-P_temp1)*10I (P_temp2-P_temp1)

Control value=54%+(13550 kW-13500 kW) I (13700-13500)

Control value=54%+0.25→round up and to 0.1% accuracy=54.3%

The function then returns an ideal control value of 54.3%.

When the wind is evenly distributed within the wind farm, Table 1 is relatively linear up to the maximum available power. See the example. At extreme locations, however, for example two WTGs in a valley and one WTG on a mountain, the distribution is very different, so the proposed method offers a good solution.

With regard to the description of the controller:

As described in detail at the outset, the controller works with two components: A control component that uses the table, and a slow integral-action controller for fine adjustment.

The control component, i.e., the fixed control term, is determined first. This is done by calculating the power to be fed into the grid.

The power output that the wind farm is to feed into the grid, which is calculated from the setpoint power value at the point of common coupling, which can also be called the grid connection point, for example as specified by a grid operator, and from the power loss in the wind farm. The power loss in the wind farm may be caused, for example, by losses in cables, transformers, by own power consumption, or even by a small factory. The power loss could also be negative. For example, if other as yet unknown producers of power are integrated into the wind farm, or there is one wind turbine in the wind farm that does not have data bus communication with the central wind farm controller, but nevertheless feeds in a specified power output of 40%, for example.

The power loss is calculated in the central wind farm controller as follows:

P_losses=sum of the current WTG power from the wind farm (sum of P_WTG_current)–current power output (Pcurrent) at the grid connection point.

This can be explained with reference to the example above: The wind farm operates without limitations and feeds a maximum output power of 14000 kW into the grid. The central wind farm controller measures an output power of 13450 kW at the grid connection point.

P_losses=(14000 kW)–13450 kW=550 kW. The losses are somewhat larger, perhaps because there are also a high-voltage transformer and some stations installed in the wind farm.

The controller is given a setpoint value of 13000 kW from the energy utility company.

In order to reach the 13000 kW at the grid connection point, all the wind turbines together would have to feed in a power output of 13000 kW (specified by the energy utility company)+550 kW (wind farm losses). The ideal setpoint value for a total wind turbine power output of 13550 kW is therefore requested from the table. The function above then returns the ideal control value of 54.3%, which thus forms a fixed control term of the control value.

It should be noted that any change in the active power or reactive power of the wind turbines may also change the power losses in the wind farm. The effect of losses could theoretically be taken into account by changing the power output, and an even better control value would then be obtained in the event of large changes in setpoint values. However, it was realized that this aspect does not need to be taken into consideration. It was realized, in particular, that this error is quickly eliminated due to the power losses in the wind farm being continuously calculated.

The controller add an integral term, namely a variable control term, to this ideal control value, i.e., to the fixed control term.

The integral term is calculated as follows:

A power difference is formed and then normed to the nominal wind farm power output ((setpoint power–actual power) I Prated). If there is a control difference greater than 6%, an integral term of 1.0 is used, which term can be referred to synonymously as an integration factor. If there is a control difference greater than 3%, an integral term of 0.3 is used, and if less than 3% an integral term of only 0.1 is used.

The integral term is limited to +–10% (=+–10 pu). The integral term is only meant to apply control within a range of +–10%, in order to compensate for any inaccuracies.

Furthermore, in the event of a large jump in the setpoint value of 8%, the integral term is set to only 0.0001. This is intended to give the wind turbine time to respond to the ideal control value. The wind turbines are given four seconds to do so. A control difference of 8% is also set if there is a downward jump in the setpoint value, and is re-initialized to zero if the integral term has run to its positive limit.

Resetting an output value of the integrator is also proposed for this controller. This takes effect as soon as the actual power output is 0.6% more than the setpoint value and the reported maximum actual power (in pu) from a WTG (P_Max_WTG_pu) is more than the total control value (ideal control value from the table+integral term). The integral term is then initialized to P_Max_WTG-Pu–ideal control value. Here too, the integral term is limited to +–10%.

The total control value, i.e., the control value, is composed of the ideal control value, i.e., the fixed control term, plus the integral term, i.e., the variable control term, and is sent to the wind farm.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling a wind turbine group having a plurality of wind turbines, comprising:
    forming a group power output as a sum of wind turbine power outputs of the wind turbine group, wherein each wind turbine of the wind turbine group respectively generates electrical power as a respective wind turbine power output for feeding into an electrical supply network;
    feeding, by the wind turbine group, the group power output into the electrical supply network at a grid connection point;
    specifying a maximum group power output for limiting the group power output;
    to comply with the maximum group power output, sending a control value to each wind turbine of the wind turbine group for limiting the respective wind turbine power output to a maximum value defined by the control value; and
    determining a control relationship between a plurality of potential control values and a respective plurality of potential group power outputs to specify the control value, wherein the control value is determined using the control relationship and the control value is determined depending on the maximum group power output; and
    storing the control relationship as a table of value tuples, wherein:
        each value tuple includes a potential control value and a potential group power output, or
        the control relationship includes a threshold control value which is representative of an associated control value at which an associated group power output reaches a current maximum value of the associated group power output, and the threshold control value is composed of the associated control value and a reserve value, or
        the control value is specified as a relative value in relation to a nominal power.

2. The method according to claim 1, wherein, to generate the control relationship successively for the plurality of potential control values, from a predefinable first potential control value to a predefinable last potential control value, calculating a respective potential group power output for a respective potential control value, wherein:
    the potential group power output for the respective potential control value is calculated as a sum of power outputs that can be generated by each of the wind turbines of the wind turbine group, and
    a power output that can be generated by a wind turbine is calculated depending on
        a nominally limited power output which is calculated using a nominal power of the wind turbine and the potential control value, and
        an available power output denoting an electrical power output which can currently be generated by the wind turbine.

3. The method according to claim 2, wherein the nominally limited power output is a product of the nominal power of the wind turbine and the potential control value.

4. The method according to claim 2, wherein a smaller of the nominally limited power output and the available power output is used as the power output that can be generated.

5. The method according to claim 1, wherein: the control relationship is updated within predefinable time intervals, wherein, in particular.

6. The method according to claim 5, wherein the predefinable time intervals are less than one minute.

7. The method according to claim 1, comprising:
    determining a reference relationship, wherein:
        a relationship between potential group power outputs and potential control values is determined as the reference relationship based on the control relationship to obtain a control value from the maximum group power output using the reference relationship.

8. The method according to claim 7, wherein the relationship is determined for some of the potential control values by using every n-th potential control value from the potential control values of the control relationship, wherein n is an integer from 2 to 100 in order to:
    find, in a first assignment step, a quick first relationship between a specified group power output and a potential control value assigned in a first approximation; and
    determine, in a second assignment step based on the potential control value assigned in said first approximation and on the control relationship, a more precisely assigned potential control value and to use the control value.

9. The method according to claim 8, wherein an interpolation between two potential control values of the control relationship is performed in the second assignment step.

10. The method according to claim 1, comprising:
    determining, by a central group computer for the wind turbine group, the control relationship;
    receiving, by the central group computer, operating values on a regular basis from the plurality of wind turbines of the wind turbine group; and
    determining, by the central group computer, the control value.

11. The method according to claim 1, wherein:
    the control value is composed of a fixed control term and a variable control term, wherein:
        the fixed control term is determined using the control relationship and as a function of the maximum group power output,
        the variable control term is determined as a function of a setpoint/actual value comparison between the maximum group power output; and the group power output fed to a grid at the grid connection point, and
        the variable control term is limited to a maximum of one tenth of the maximum value of the control value.

12. The method according to claim 11, wherein:
    setpoint/actual comparison of values are taken into account as a control error, and
    the variable control term includes an integral term of the control error, wherein:
        the integral term obtained from the control error is determined by integration using an integration factor.

13. The method according to claim 12, wherein:
the integral term is limited to a fraction of a maximum value of the control value, and the fraction is in a range between 5% and 20% of the maximum value of the control value, or
the variable control term, after a change in the specified maximum group power output by a value greater than a specified change limit, is determined or supplied with a time delay, or at least completely determined or supplied with a time delay initially, wherein the time delay ranges between 1 and 20 seconds.

14. The method according to claim 12, wherein the integration factor depends on an amplitude of the control error, wherein the integration factor is positively correlated with a magnitude of the control error.

15. The method according to claim 11, wherein the variable control term is determined with an aid of an integrator and an output value of the integrator is reset when there is a change in the maximum group power output.

16. A method of controlling a wind farm having a plurality of wind turbine groups, comprising:
controlling each wind turbine group of the plurality of wind turbine groups using the method according to claim 1;
specifying a maximum farm output power to limit a farm power output fed to a grid at the grid connection point;
subdividing the maximum farm output power into a plurality of maximum power output fractions in accordance with a distribution rule;
sending, to each wind turbine group of the plurality of the wind turbine groups, one of the plurality of maximum power output fractions as the maximum group power output; and
controlling each wind turbine group of the plurality of the wind turbine groups depending on the maximum group power output.

17. The method according to claim 16, wherein the distribution rule splits the maximum farm output power into the plurality of maximum power output fractions, depending on:
a nominal group power output of each wind turbine group of the plurality of wind turbine groups,
a status of each wind turbine group, or
an operational condition of each wind turbine group of the plurality of wind turbine groups.

18. The method according to claim 1, wherein the sum of wind turbine power outputs of the wind turbine group excludes power losses in a wind farm.

19. A wind turbine group having a plurality of wind turbines, comprising:
a group computer including a group controller configured to control the wind turbine group, wherein each of the plurality of wind turbines generates electrical power as wind turbine power output for feeding into an electrical supply network, wherein the wind turbine group feeds a group power output into the electrical supply network at a grid connection point, wherein the group power output is formed as a sum of a plurality of wind turbine power outputs of the wind turbine group, and the group controller is configured such that:
a maximum group power output is specified for limiting the group power output;
a control value for compliance with the maximum group power output is sent to each wind turbine of the wind turbine group to limit the respective wind turbine power output of the respective wind turbine to a maximum value defined by the control value;
a control relationship is determined as a relationship between potential control values and potential group power outputs, in order to specify the control value, and the control value is determined using the control relationship, and depending on the maximum group power output; and
the control relationship is stored as a table of value tuples, wherein:
each value tuple includes a potential control value and a potential group power output, or
the control relationship includes a threshold control value which is representative of an associated control value at which an associated group power output reaches a current maximum value of the associated group power output, and the threshold control value is composed of the associated control value and a reserve value, or
the control value is specified as a relative value in relation to a nominal power.

20. A wind farm, comprising:
a plurality of wind turbine groups including the wind turbine group according to claim 19;
the grid connection point; and
a central wind farm computer.

21. The wind turbine group according to claim 19, wherein the sum of the plurality of wind turbine power outputs of the wind turbine group excludes power losses in a wind farm.

22. A method of controlling a wind turbine group having a plurality of wind turbines, comprising:
forming a group power output as a sum of wind turbine power outputs of the wind turbine group, wherein each wind turbine of the wind turbine group respectively generates electrical power as a respective wind turbine power output for feeding into an electrical supply network;
feeding, by the wind turbine group, the group power output into the electrical supply network at a grid connection point;
specifying a maximum group power output for limiting the group power output;
to comply with the maximum group power output, sending a control value to each wind turbine of the wind turbine group for limiting the respective wind turbine power output to a maximum value defined by the control value;
determining a control relationship between a plurality of potential control values and a respective plurality of potential group power outputs to specify the control value, wherein the control value is determined using the control relationship and the control value is determined depending on the maximum group power output; and
to determine the control relationship successively for the plurality of potential control values, from a predefinable first potential control value to a predefinable last potential control value, calculating a respective potential group power output for a respective potential control value, wherein:
the potential group power output for the respective potential control value is calculated as a sum of power outputs that are capable of being generated by each of the wind turbines of the wind turbine group, and
a power output capable of being generated by a wind turbine is calculated depending on a nominally limited power output which is calculated using a nominal power of the wind turbine and the potential control value, and an available power output denoting an electrical power output which can currently be generated by the wind turbine.

23. The method according to claim 22, wherein the sum of wind turbine power outputs of the wind turbine group excludes power losses in a wind farm.

* * * * *